United States Patent
Choi

(10) Patent No.: US 9,421,880 B2
(45) Date of Patent: Aug. 23, 2016

(54) ADD-ON COMMUNICATION APPARATUS ATTACHED TO CABLE INSTALLMENT TYPE CHARGING CONTROL DEVICE

(71) Applicant: LSIS CO., LTD., Anyang-si, Gyeonggi-do (KR)

(72) Inventor: Seung Woo Choi, Suwon-si (KR)

(73) Assignee: LSIS CO., LTD., Anyang-si (KR)

( * ) Notice: Subject to any disclaimer, the term of this patent is extended or adjusted under 35 U.S.C. 154(b) by 160 days.

(21) Appl. No.: 14/311,038

(22) Filed: Jun. 20, 2014

(65) Prior Publication Data
US 2015/0015211 A1 Jan. 15, 2015

(30) Foreign Application Priority Data
Jul. 10, 2013 (KR) .................. 10-2013-0080745

(51) Int. Cl.
*H02J 7/00* (2006.01)
*B60L 11/18* (2006.01)
*B60L 3/00* (2006.01)

(52) U.S. Cl.
CPC ......... *B60L 11/1838* (2013.01); *B60L 11/1816* (2013.01); *B60L 11/1861* (2013.01); *B60L 3/0069* (2013.01); *B60L 2230/12* (2013.01); *B60L 2230/16* (2013.01); *B60L 2230/40* (2013.01); *Y02T 10/7005* (2013.01); *Y02T 10/705* (2013.01); *Y02T 10/7044* (2013.01); *Y02T 10/7088* (2013.01);
(Continued)

(58) Field of Classification Search
CPC ....................................... Y02E 60/12

USPC ......................................................... 320/137
See application file for complete search history.

(56) References Cited

U.S. PATENT DOCUMENTS

2010/0174667 A1* 7/2010 Vitale .................... B60L 3/009
 705/412
2010/0306033 A1 12/2010 Oved et al.
(Continued)

FOREIGN PATENT DOCUMENTS

CN 103516034 1/2014
EP 2455924 5/2012
(Continued)

OTHER PUBLICATIONS

Japan Patent Office Application Serial No. 2014-140620, Office Action dated Jul. 7, 2015, 3 pages.
(Continued)

*Primary Examiner* — Suresh Memula
(74) *Attorney, Agent, or Firm* — Lee Hong Degerman Kang & Waimey; Jonathan Kang; Jeffrey Lotspeich

(57) ABSTRACT

An add-on communication device attached to a cable installment type charging control device attached to a cable assembly for charging an electric vehicle is disclosed. The add-on communication device includes a first communication unit wirelessly communicating with a terminal device, a second communication unit wirelessly communicating with the cable installment type charging control device, and a control unit. The control unit receives a command from the terminal device through the first communication unit, creates a first control command on the basis on the command, and transmits the first control command to the cable installment type charging control device through the second communication unit.

3 Claims, 9 Drawing Sheets

(52) U.S. Cl.
CPC ............. *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y04S 30/12* (2013.01)

(56) References Cited

U.S. PATENT DOCUMENTS

| | | | |
|---|---|---|---|
| 2011/0172839 | A1 | 7/2011 | Brown et al. |
| 2012/0109798 | A1 | 5/2012 | Shelton et al. |

FOREIGN PATENT DOCUMENTS

| | | |
|---|---|---|
| JP | 2010-022099 | 1/2010 |
| JP | 2010-061506 | 3/2010 |
| JP | 2010-110051 | 5/2010 |
| JP | 2011-250617 | 12/2011 |
| KR | 10-2011-0097699 | 8/2011 |
| KR | 10-2013-0047905 | 5/2013 |
| WO | 2010/022059 | 2/2010 |

OTHER PUBLICATIONS

European Patent Office Application Serial No. 14174081.1, Search Report dated Jun. 19, 2015, 9 pages.

Japan Patent Office Application Serial No. 2014-140620, Notice of Allowance dated Mar. 22, 2016, 3 pages.

The State Intellectual Property Office of the People's Republic of China Application Serial No. 201410328396.2, Office Action dated Dec. 28, 2015, 8 pages.

\* cited by examiner

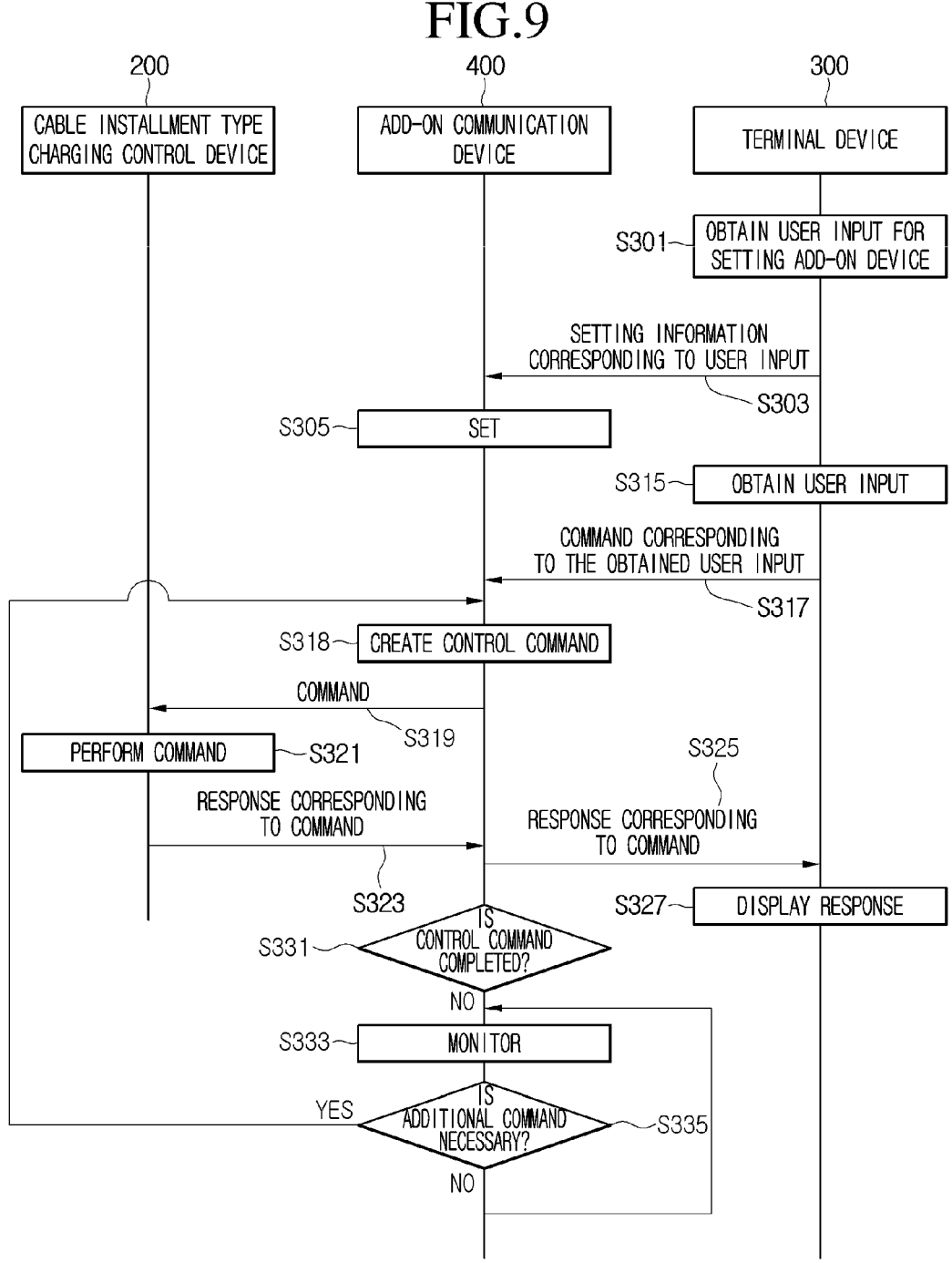

ADD-ON COMMUNICATION APPARATUS ATTACHED TO CABLE INSTALLMENT TYPE CHARGING CONTROL DEVICE

CROSS-REFERENCE TO RELATED APPLICATIONS

Pursuant to 35 U.S.C. §119(a), this application claims the benefit of earlier filing date and right of priority to Korean Patent Application No. 10-2013-0080745, filed on Jul. 10, 2013, the contents of which are hereby incorporated by reference in its entirety.

BACKGROUND

The present disclosure relates to charging of an electric vehicle.

The electric vehicle refers to a vehicle driven by using electricity, and is mainly classified into a battery powered electric vehicle and a hybrid electric vehicle. The battery powered electric vehicle is driven by using only electricity without fossil fuel, which is generally called an electric vehicle. In addition, the hybrid electric vehicle is driven by using both of the electricity and the fossil fuel. In addition, the electric vehicle is equipped with a battery to supply electricity for driving. In particular, the battery powered electric vehicle and a plug-in type hybrid electric vehicle have batteries charged with power supplied from an external power supply, and drive an electric motor by using the power charged in the battery.

When the electric vehicle is charged with 60 Hz-commercial grid power supplied through a household socket, an electric vehicle charging cable assembly is used.

The electric vehicle charging cable assembly includes a connector connected to the electric vehicle, a plug connected with the socket, and a power cable to link the connector to the plug.

Since the electric vehicle charging cable assembly is used under various environments, a cable installment type charging control device to ensure the stable charging of the electric vehicle may be provided in the electric vehicle charging cable assembly. The cable installment type charging control device is attached to the power cable so that the cable installment type charging control device is not easily separated from the power cable by a user. In order to ensure the stable charging of the electric vehicle, the cable installment type charging control device is necessary to be strong against an external temperature, external humidity, vibration, and impact. If the cable installment type charging control device includes a connector for wired communication, the connector may include a metal port. Accordingly, the cable installment type charging control device may not satisfy the requirements described above.

However, since the user wants to check the charging state, it is necessary for the cable installment type charging control device, which is attached to the electric vehicle charging cable assembly, to notify the user of the charging state.

To this end, the cable installment type charging control device may show the charging-related information or the failure information through LEDs having a predetermined color.

In other words, the user is required to personally check the cable installment type charging control device with the eyes of the user in order to obtain the charging-related information. In general, the user may want to more check the charging state under the environment that it is rainy, cold, or hot. However, the user feels inconvenient because the user goes out under the above weather situation to personally check the cable installment type charging control device with the eyes of the user.

SUMMARY

Embodiments provide a system, an apparatus, and a method capable of conveniently providing electric vehicle charging related information to a user.

In one embodiment, an add-on communication device attached to a cable installment type charging control device attached to a cable assembly for charging an electric vehicle, includes: a first communication unit wirelessly communicating with a terminal device; a second communication unit wirelessly communicating with the cable installment type charging control device; and a control unit.

The control unit may receive a command from the terminal device through the first communication unit, create a first control command on the basis on the command, and transmit the first control command to the cable installment type charging control device through the second communication unit.

The control unit may receive setting information from the terminal device through the first communication unit, create a second control command corresponding to an additional control command of the first control command on the basis of the setting information, and transmit the second control command to the cable installment type charging control device through the second communication unit.

The setting information may include setting information on an allowable charge amount.

The command may represent charging start of the electric vehicle.

The first control command may represent the charging start of the electric vehicle.

The second control command may represent charging stop of the electric vehicle.

The control unit may create the second control command, when a power quantity supplied to the electric vehicle reaches the allowable charge amount.

The setting information on the allowable charge amount may include setting information on an allowable charge amount in a home area and setting information on an allowable charge amount in a public area.

The control unit may create the second control command when a current position is in the home area and the power quantity supplied to the electric vehicle reaches the allowable charge amount in the home area, and create the second control command when a current position is in the public area and the power quantity supplied to the electric vehicle reaches the allowable charge amount in the public area.

The command may represent the charging start of the electric vehicle.

The control unit may obtain a current position of the electric vehicle, and create the first control command on the basis of the command and the current position.

A set of values representable by the current position of the electric vehicle may include the home area and the public area.

The control unit may create the first control command representing charging start in a low speed charging mode when the current position is in the home area, and create the first control command representing charging start in a high speed charging mode when the current position is in the public area.

The control unit may receive a response to the first control command from the cable installment type charging control device through the second communication unit, and transmit the response to the terminal device through the first communication unit.

The command may represent a request for charging related information on the electric vehicle, and the response may include the charging related information on the electric vehicle.

The charging related information may include at least one of information on the electric vehicle and information on the cable assembly.

The information on the cable assembly may include at least one of information on a charging operation of the cable assembly, information on a use history of the cable assembly, information on a state of the cable assembly, and information on failure of the cable assembly.

The information on the state of the cable assembly may include at least one of information on a relay state of the cable assembly, information on whether the relay is fused, information on a temperature of the cable assembly, information on short circuit of the cable assembly, information on disconnection of the cable assembly, and information on surrounding environment of the cable assembly.

The information on the electric device may include at least one of an initial charging state, a current charging state, charging start time, predictive charging completion time, actual charging completion time, information on electric vehicle charging situation, electric vehicle charging error information, information on a power quantity supplied to the electric vehicle, and information on a magnitude of a current applied to the electric vehicle.

In another embodiment, an operation method of an add-on communication device attached to a cable installment type charging control device attached to a cable assembly for charging an electric vehicle, includes: receiving a command from a terminal device; creating a first control command on the basis on the command; and transmitting the first control command to the cable installment type charging control device.

A set of values representable by the command may include at least one of charging start of the electric vehicle, charging stop of the electric vehicle, and a request for charging related information on the electric vehicle.

The method may further include: receiving setting information from the terminal device; creating a second control command corresponding to an additional control command of the first control command on the basis of the setting information; and transmitting the second control command to the cable installment type charging control device.

The creating of the second control command may include: checking the first control command is completed; when the first control command is not completed, monitoring a charging state of the electric vehicle; checking whether the addition control command is necessary for the cable installment type charging control device on the basis of at least one of the charging state of the electric vehicle and the setting information; and creating the second control command corresponding to the additional control command on the basis of the setting information and the charging state of the electric vehicle.

The charging state of the electric vehicle may include a power quantity supplied to the electric vehicle.

The setting information may include information on an allowable charge amount.

The checking of whether the additional control command is necessary may include comparing the power quantity supplied to the electric vehicle and the allowable charge amount and checking whether the additional control command is necessary.

The comparing of the power quantity supplied to the electric vehicle and the allowable charge amount may include: when the power quantity supplied to the electric vehicle reaches the allowable charge amount, determining that the additional control command is necessary; and when the power quantity supplied to the electric vehicle does not reach the allowable charge amount, determining that the additional control command is not necessary.

The details of one or more embodiments are set forth in the accompanying drawings and the description below. Other features will be apparent from the description and drawings, and from the claims.

BRIEF DESCRIPTION OF THE DRAWINGS

FIG. 9 is a ladder diagram showing an operating method of an electric vehicle charging system according to another embodiment.

DETAILED DESCRIPTION OF THE EMBODIMENTS

Reference will now be made in detail to the embodiments of the present disclosure, examples of which are illustrated in the accompanying drawings.

In the following description, usage of suffixes such as 'module', 'part' or 'unit' used for referring to elements is given merely to facilitate explanation of the present invention, without having any discriminated meaning or role by itself.

A terminal device according to the embodiment may include a cellular phone, a smart phone, a laptop computer, a digital broadcasting receiver, Personal Digital Assistants (PDA), Portable Multimedia Player (PMP), and a navigation device. It may be easily understood by those skilled in the art that the configuration disclosed through the embodiment is applicable to a stationary terminal such as a digital TV or a desktop computer, excluding a case of being applicable only to a mobile terminal.

Hereinafter, description about a first embodiment of an electric vehicle charging system is provided with reference to the accompanying drawings.

Figure 1:
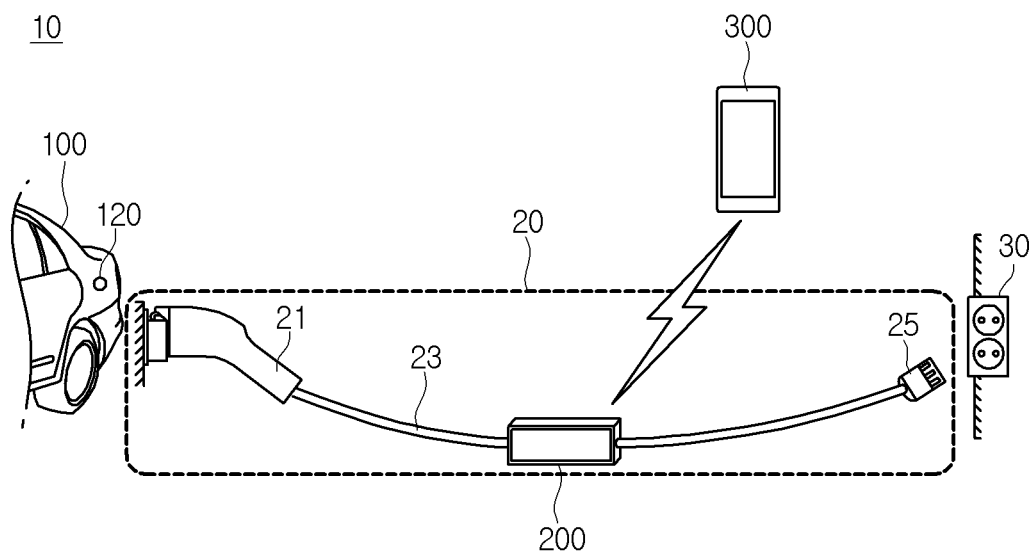
FIG. 1 is a conceptual diagram of an electric vehicle charging system according to an embodiment.

FIG. 1 is a conceptual diagram of an electric vehicle charging system according to an embodiment.

Referring to FIG. 1, an electric vehicle charging system 10 according to an embodiment includes an electric vehicle 100, an electric vehicle charging cable assembly 20, a socket 30, and a terminal device 300.

The socket 30 provides AC power.

The electric vehicle 100 is connected to the socket 30 through the electric vehicle charging cable assembly 20 and receives the AC power from the socket 30.

The electric vehicle charging cable assembly 20 delivers AC power from the socket 30 to the electric vehicle 100.

The electric vehicle charging cable assembly 20 includes cable installment type charging control device 200, an electric vehicle connector 21, a power cable 23, and a plug 25.

The power cable 23 delivers power. The power cable 23 may include an EV-side power cable and a grid-side power cable.

The electric vehicle connector 21 is inserted into an electric vehicle inlet 120 and connected to the electric vehicle inlet 120, and may adhere to SAE J1772 specification.

The plug 25 is inserted and connected to the socket 30.

The cable installment type charging control device 200 monitors charging the electric vehicle 100, provides charging related information obtained through the monitoring to the terminal device 300, and controls charging of the electric vehicle 100.

In an embodiment, the cable installment type charging control device 200 is fixedly attached to the power cable 23 in order not to be easily separated from the power cable 23 by the user, and has characteristics robust to an external temperature, external humidity, vibration, or impact.

In particular, the cable installment type charging control device 200 is fixedly and integrally attached to the power cable 53 in order not to be easily separated from the EV-side power cable by the user.

In addition, the cable installment type charging control device 200 is fixedly and integrally attached to the power cable 63 in order not to be easily separated from the grid-side power cable by the user.

On the other hand, in an embodiment, the cable installment type charging control device 200 may include a connector so as to be connected to or separated from the power cable 23 by the user. At this point, the connector is necessary to have characteristics robust to an external temperature, external humidity, vibration, or impact.

In particular, the cable installment type charging control device 200 may include a connector so as to be connected to or separated from the EV-side power cable by the user. At this point, the connector is necessary to have characteristics robust to an external temperature, external humidity, vibration, or impact.

In addition, the cable installment type charging control device 200 may include a connector so as to be connected to or separated from the grid-side power cable by the user. At this point, the connector is necessary to have characteristics robust to an external temperature, external humidity, vibration, or impact.

When the cable installment type charging control device 200 includes a connector for wired communication, since this connector includes a metal port, the cable installment type charging control device 200 may be weak to external environments. In order to address such an issue, the cable installment type charging control device 200 may wirelessly transmit charging related information to the terminal device 300.

The terminal device 300 wirelessly communicates in a non-contact scheme with the electric vehicle charging cable assembly 20 and displays information related to the electric vehicle charging cable assembly 20.

Figure 2:
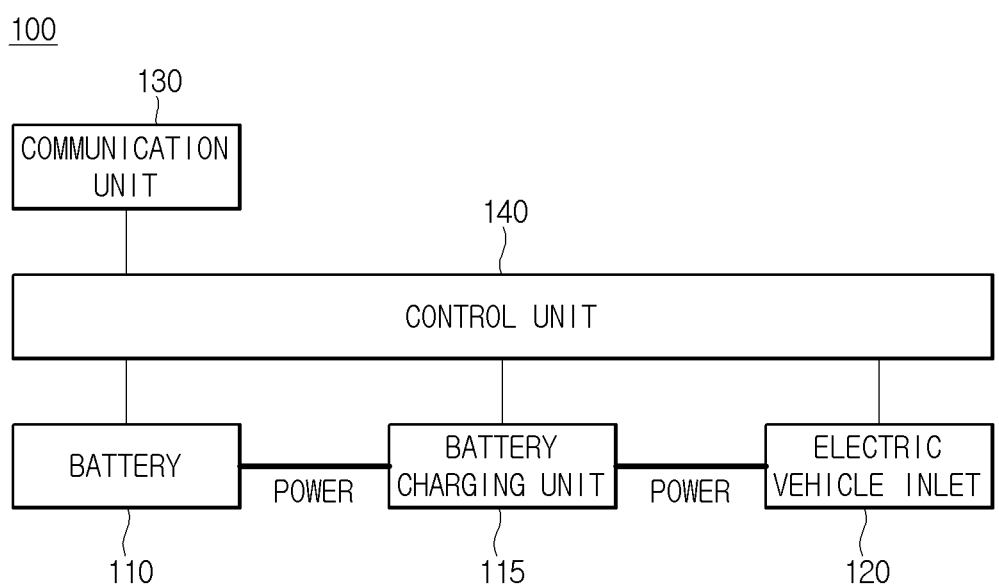
FIG. 2 is a block diagram of an electric vehicle according to an embodiment.

FIG. 2 is a block diagram of an electric vehicle according to an embodiment.

The electric vehicle 100 includes a battery 110, a battery charging device 115, an electric vehicle inlet 120, a communication unit 130, and a control unit 140.

The battery 110 provides power for driving the electric vehicle 100 to the electric vehicle 100.

The electric vehicle inlet 120 is a connector for receiving power for charging of the battery 100 from outside. The electric vehicle inlet 120 may adhere to SAE J1772 specification.

The battery charging device 115 charges the battery 110 by using power provided through the electric vehicle inlet 120.

The communication unit 130 may communicate with the electric vehicle charging cable assembly 20 or the terminal device 300.

The control unit 140 controls an overall operation of the electric vehicle 100.

Figure 3:
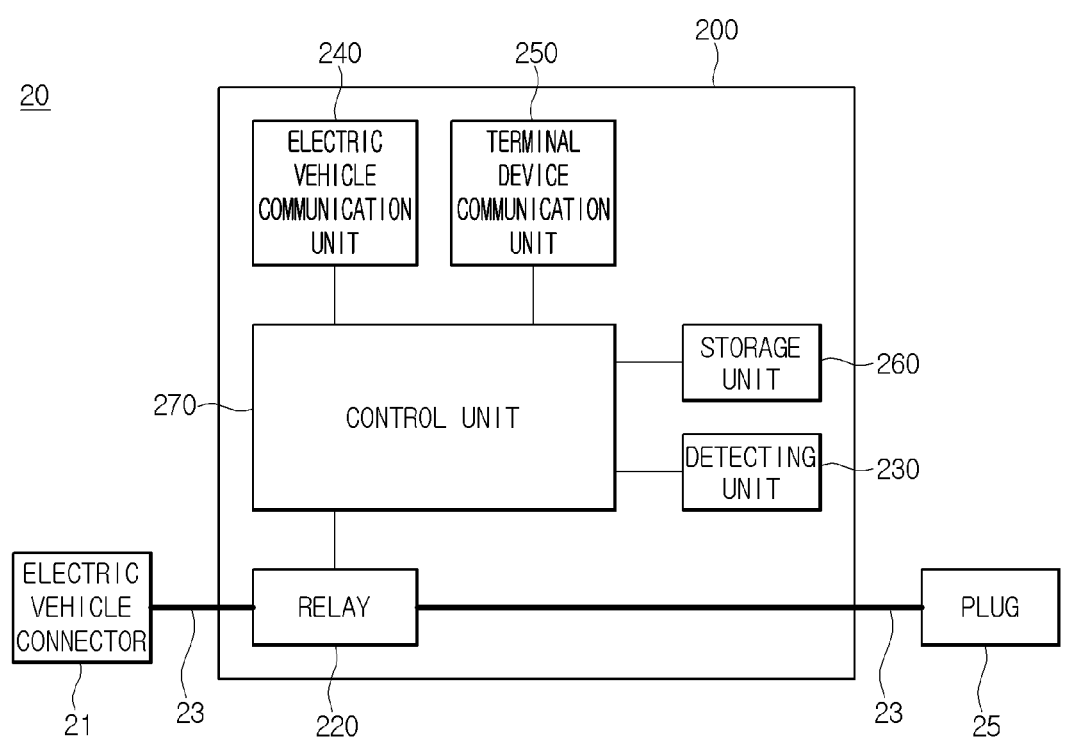
FIG. 3 is a block diagram of an electric vehicle charging cable assembly according to an embodiment.

FIG. 3 is a block diagram of an electric vehicle charging cable assembly according to an embodiment.

As described above, the electric vehicle charging cable assembly 20 includes a cable installment type charging control device 200, an electric vehicle connector 21, a power cable 23, and a plug 25.

At this point, the cable installment type charging control device 200 includes a relay 220, a detecting unit 230, an electric vehicle communication unit 240, a terminal device communication unit 250, a storage unit 260, and a control unit 270.

The relay 220 controls to cut off power transmission through the power cable 23. In detail, when turned off, the relay 220 cuts off power transmission through the power cable 23. When turned on, the relay 220 provides power transmission through the power cable 23.

The detecting unit 230 detects information related to charging of the electric vehicle to be described later. In particular, the detecting unit 230 may detect all information on the electric vehicle 100 and information on the electric vehicle charging cable assembly 20. The detecting unit 230 may not detect information on the electric vehicle, but on the electric vehicle charging cable assembly 20. In detail, the detecting unit 230 may include a relay fusion detecting unit, a current detecting unit, an internal temperature detecting unit, an internal humidity detecting unit, an external temperature unit, an external humidity detecting unit, a short circuit detecting unit, and a disconnection detecting unit. The relay fusion detecting unit may detect whether the relay 220 is fused. The current detecting unit may detect amplitude of a current flowing through the power cable 23. The internal temperature detecting unit may an internal temperature of the electric vehicle charging cable assembly 20. The internal humidity detecting unit may detect an internal humidity of the electric vehicle charging cable assembly 20. The external temperature detecting unit detects a surrounding temperature of the cable installment type charging control device 200. The external humidity detecting unit may detect a surrounding humidity of the cable installment type charging control device 200. The short circuit detecting unit may detect whether the electric vehicle charging cable assembly 20 is short-circuited. The disconnection detecting unit may detect whether the electric vehicle charging cable assembly 20 is disconnected.

The electric vehicle communication unit 240 performs communication with the electric vehicle 100. In detail, the electric vehicle communication unit 240 performs communication with the communication unit 130 of the electric vehicle 100. The electric vehicle communication unit 240 may perform communication with the communication unit 130 through the power cable 23 in a power-cable communication scheme. In addition, the electric vehicle communication unit 240 and the communication unit 130 may perform communication with each other through an infrared data association (IrDA) scheme, a radio frequency communication scheme, a Bluetooth scheme, an ultra wideband (UWB) scheme, a ZigBee scheme, and a digital living network alliance (DLNA) scheme.

The terminal device communication unit 250 performs communication with the terminal device 300. In detail, the terminal device communication unit 250 performs communication with a communication unit 310 of the terminal device 300. In particular, the terminal device communication unit 250 and the communication unit 310 may perform communication with each other through an IrDA scheme, a radio frequency communication scheme, a Bluetooth scheme, a UWB scheme, a ZigBee scheme, and a DLNA scheme.

The storage unit 260 stores various pieces of information to be described later. In detail, the storage unit 260 may store the charging related information on the electric vehicle 100. The storage unit 260 may store the information on the use history of the cable installment type charging control device 200. For example, the storage unit 260 may store the information on the final use time point, use time, and accumulated use time of the cable installment type charging control device 200.

The control unit 270 controls the overall operation of the cable installment type charging control device 200 together with the following operation.

Figure 4:
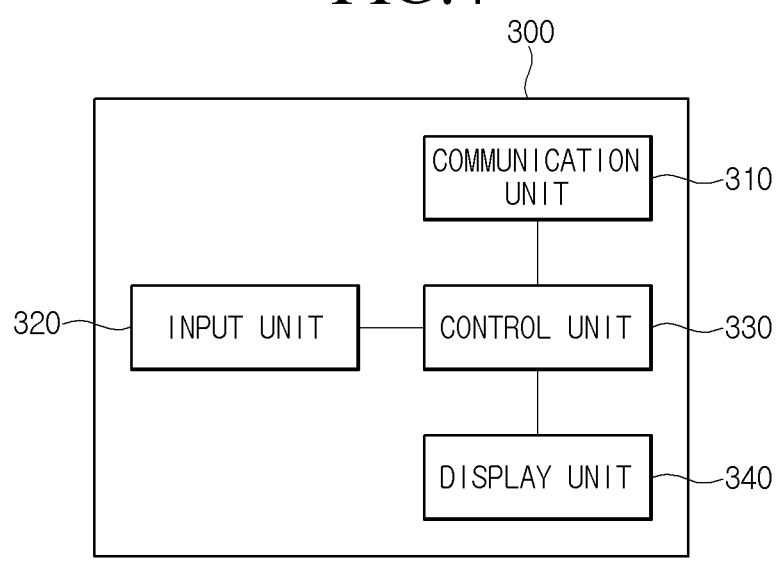
FIG. 4 is a block diagram of a terminal device according to an embodiment.

FIG. 4 is a block diagram of a terminal device according to one embodiment.

The terminal device 300 includes the communication unit 310, an input device 320, a control unit 330, and a display unit 340.

The communication unit 310 performs communication with the terminal device communication unit 250.

The input device 320 obtains a user input. The input device 320 may include at least one of a touch screen, a physical button, a microphone for obtaining the user input in a voice type, an acceleration sensor for obtaining a motion gesture of the terminal device 300 as the user input, a keyboard, a mouse, and a keypad.

The control unit 330 controls the overall operation of the terminal device 300 together with the following operation.

The display unit 340 displays information on the charging operation and a charging state of the cable installment type charging control device 200. The display unit 340 may display information on failure of the cable installment type charging control device 200 and information on action of a user dealing with the failure. For example, the display unit 340 may display information on the charging operation and the charging state of the cable installment type charging control device 200 through visually indicating manners including at least one of characters, geometrical figures, or light, and/or acoustically indicating manners including a sound.

Figure 5:
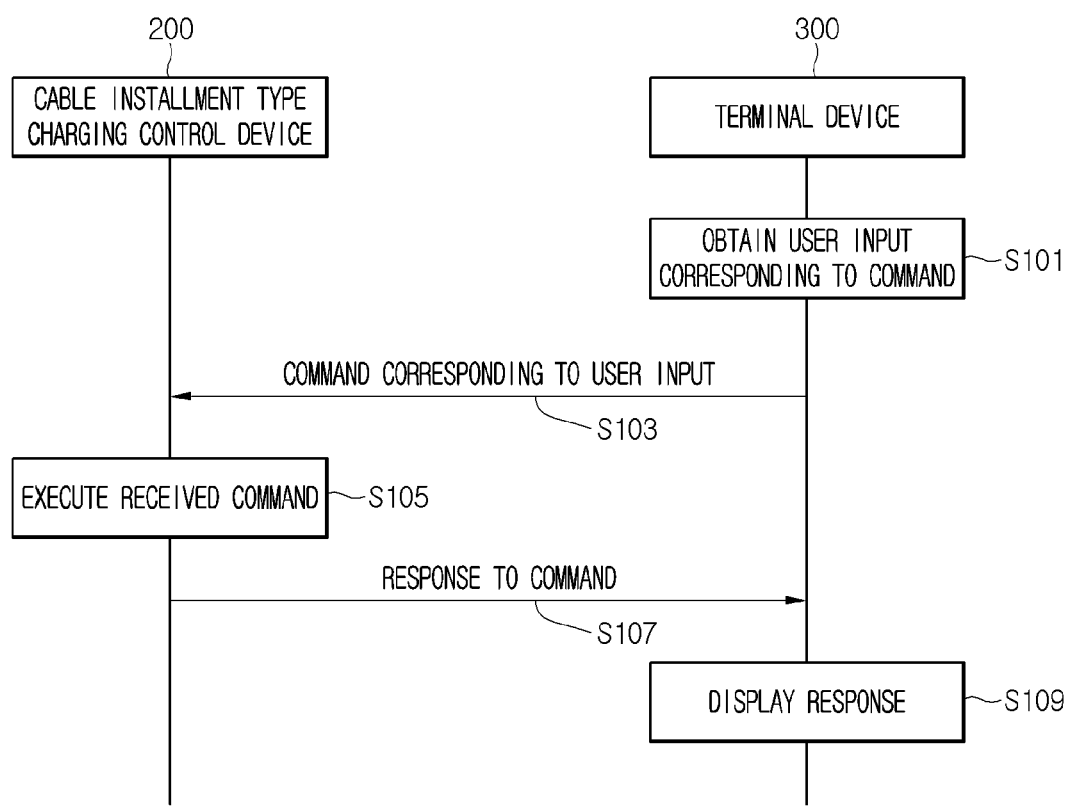
FIG. 5 is a ladder diagram showing an operation method of electric vehicle charging system according to an embodiment.

FIG. 5 is a ladder diagram showing an operation method of electric vehicle charging system according to an embodiment.

The control unit 330 of the terminal device 300 obtains the user input to issue a command to the electric vehicle charging cable assembly 20 through the input device 320 (operation S101). At this point, the user input for controlling the electric vehicle charging cable assembly 20 may include one or more of an input to start charging of the electric vehicle 100, an input to stop the charging of the electric vehicle 100, and an input to request the charging related information on the electric vehicle 100.

The control unit 330 of the terminal device 300 transmits a command corresponding to the obtained user input to the cable installment type charging control device 200 through the communication unit 310 (operation S103). The control unit 270 of the cable installment type charging control device 200 receives the command through the terminal device communication unit 250.

The control unit 270 of the cable installment type charging control device 200 executes the received command (operation S105).

In detail, when the command corresponding to the user input is a command to start the charging of the electric vehicle 100, the control unit 270 of the cable installment type charging control device 200 turns on the relay 220 that has been turned off, so that the electric vehicle charging cable assembly 20 may supply AC power to the electric vehicle 100 through the socket 30.

When the command corresponding to the user input is a command to stop the charging of the electric vehicle 100, the control unit 270 of the cable installment type charging control device 200 turns off the relay 220, which has been turned on, to prevent the electric vehicle charging cable assembly 20 from charging the electric vehicle 100.

When the command corresponding to the user input is a command to request the charging related information on the electric vehicle 100, the control unit 270 of the cable installment type charging control device 200 collects the charging related information on the electric vehicle 100.

The control unit 270 of the cable installment type charging control device 200 transmits a response to the received command to the terminal device 300 through the terminal device communication unit 250 (operation S107).

When the command corresponding to the user input is the command to start the charging of the electric vehicle 100, the response may include information notifying that the relay 220 is in a turn-on state.

When the command corresponding to the user input is the command to stop the charging of the electric vehicle 100, the response may include information notifying that the relay 220 is in a turn-off state.

When the command corresponding to the user input is the command to request the charging related information on the electric vehicle 100, the response may include the collected charging related information on the electric vehicle 100.

The charging related information on the electric vehicle 100 may include at least one of information on the electric vehicle 100 and the information on the electric vehicle charging cable assembly 20.

The information on the electric vehicle 100 may include at least one of an initial charging state, a current charging state, a charging start time, an estimated charging finish time, an actual charging finish time, charging status information on the electric vehicle 100, charging error information on the electric vehicle 100, information on the power quantity supplied to the electric vehicle 100, and the information on amplitude of current applied to the electric vehicle 100. The initial charging state and the current charging state may be represented as a ratio of a current charged power quantity to the total capacity of the battery 110. The charging status information on the electric vehicle 100 may represent that the electric vehicle 100 is in the middle of being charged with power, in the standby state for charging, or has been completely charged. The information on the electric vehicle charging cable assembly 20 may include at least one of information on the charging operation of the electric vehicle charging cable assembly 20, information on the use history of the electric vehicle charging cable assembly 20, state information on the electric vehicle charging cable assembly 20, and information on the failure of the electric vehicle charging cable assembly 20. The information on the charging operation of the electric vehicle charging cable assembly 20 represents whether the electric vehicle charging cable assembly 20 supplies the power, which is received through the socket 30, to the electric vehicle 100. The state information on the electric vehicle charging cable assembly 20 may include state information on the relay 220, the information on whether the relay 220 is fused, information on temperature of the electric vehicle charging cable assembly 20, information on the short-circuit of the electric vehicle charging cable assembly 20, information on disconnection of the electric vehicle charging cable assembly 20, and information on surrounding environments of the electric vehicle charging cable assembly 20. The state information on the relay 220 may represent whether the relay 220 is turned on or turned off. The information on the surrounding environments of the electric vehicle charging cable assembly 20 may include at least one of information on the surrounding temperature and information on the surrounding humidity.

The control unit 330 of the terminal device 300 displays the received response on the display unit 340 (operation S109).

When the command corresponding to the user input is a command for starting the charging of the electric vehicle 100, the control unit 330 of the terminal device 300 may display the information notifying that the relay 220 is in the turn-on state on the display unit 340.

When the command corresponding to the user input is a command for stopping the charging of the electric vehicle 100, the control unit 330 of the terminal device 300 may display the information notifying that the relay 220 is in the turn-off state on the display unit 340.

When the command corresponding to the user input is a command for requesting the charging related information on the electric vehicle 100, the control unit 330 of the terminal device 300 may display the charging related information on the electric vehicle 100 on the display unit 340. The user may input an additional user input for controlling the electric vehicle charging cable assembly 20, to the terminal device 300 through the input device 320 based on the displayed charging related information on the electric vehicle 100.

As described above, the information on the charging operation and the state information on the electric vehicle charging cable assembly 20 are displayed through the terminal device 300. Accordingly, the user may simply and easily recognize the information on the charging operation and the state information on the electric vehicle charging cable assembly 20. In addition, the user more easily determines the failure of the electric vehicle charging cable assembly 20 and the failed part of the electric vehicle charging cable assembly 20 based on the state information on the electric vehicle charging cable assembly 20, so that the user can easily take an action of dealing with the failure. For example, when the ground line is short-circuited between the electric vehicle charging cable assembly 20 and the power supply, the short-circuited ground line is difficult to detect according to the related art. However, according to the embodiment, the detecting unit 230 detects and displays the disconnection state, so that the user stops the charging of the electric vehicle charging cable assembly 20 and repairs the disconnected part or requests the repair for the disconnected part. In particular, when the information on the failure of the electric vehicle charging cable assembly 20 and the information on the action of dealing with the failure are transmitted to the terminal device 300 from the cable installment type charging control device 200, the user can more simply and easily detect the failure of the electric vehicle charging cable assembly 20 and take an action of dealing with the failure. Accordingly, the user can recognize in advance that the electric vehicle 100 is not charged due to the failure of the electric vehicle charging cable assembly 20. In addition, for example, if the use history of the electric vehicle charging cable assembly 20 is transmitted to the terminal device 300, the user can estimate in advance the life span of the electric vehicle charging cable assembly 20 and prepare an additional electric vehicle charging cable assembly.

On the other hand, frequent uses under an inferior environment cause the electric vehicle charging cable assembly 20 to be frequently repaired or replaced. However, when the electric vehicle charging cable assembly 20 includes the cable installment type charging control device 200 including relatively expensive terminal device communication unit 250, it is more difficult to repair the electric vehicle charging cable assembly 20 due to the characteristics of the cable installment type charging control device 200 manufactured to have the characteristics robust to an external temperature, external humidity, vibration, and impact, and a replacement cost may be increased.

In order to address the above-described issue, the terminal device communication unit 250 may be separated from the cable installment type charging control device 200. Such an embodiment will be described with reference to FIGS. 6 to 9.

Figure 6:
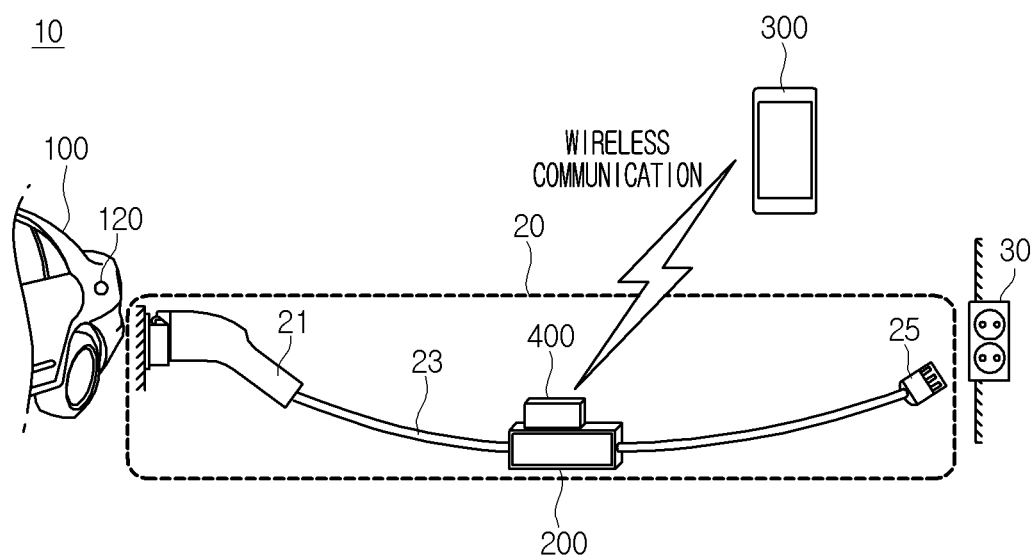
FIG. 6 is a conceptual diagram of an electrical vehicle charging system according to another embodiment.

FIG. 6 is a conceptual diagram of an electrical vehicle charging system according to another embodiment Referring to FIG. 6, an electric vehicle charging system 10 according to an embodiment includes an electric vehicle 100, an electric vehicle charging cable assembly 20, a socket 30, a terminal device 300, and an add-on communication device 400.

Since the socket 30 and the electric vehicle 100 according to the embodiment are similar to those of the previous embodiment of FIG. 1, the details thereof will be omitted.

The electric vehicle charging cable assembly 20 transmits AC power to the electric vehicle 100 from the socket 30.

The electric vehicle charging cable assembly 20 includes a cable installment type charging control device 200, an electric vehicle connector 21, a power cable 23, and a plug 25.

Since the power cable 23, the electric vehicle connector 21, and the plug 25 according to the embodiment are the same as or similar to those of the previous embodiment of FIG. 1, the details thereof will be omitted.

The cable installment type charging control device 200 monitors the charging of the electric vehicle 100, and provides the charging related information obtained through the monitoring to the add-on communication device 400, thereby controlling the charging of the electric vehicle 100. The cable installment type charging control device 200 is integrally attached to the power cable 23 in order not to be easily separated from the power cable 23 by a user. The cable installment type charging control device 200 has the characteristics robust to an external temperature, external humidity, vibration, and impact. When the cable installment type charging control device 200 includes a connector for wired communication, since the connector includes a metal port, the cable installment type charging control device 200 may be weak to external environments. In order to address the above issue, the cable installment type charging control device 200 may perform wireless communication with the add-on communication device 400.

The terminal device 300 performs wireless communication with the add-on communication device 400 in a non-contact scheme and displays the information on the electric vehicle charging cable assembly 20.

The add-on communication device 400 is attached to the cable installment type charging control device 200. At this point, the add-on communication device 400 may be mechanically coupled with the cable installment type charging control device 200. In addition, the add-on communication device 400 may be attached to the cable installment type charging control device 200 by a magnetic force.

Figure 7:
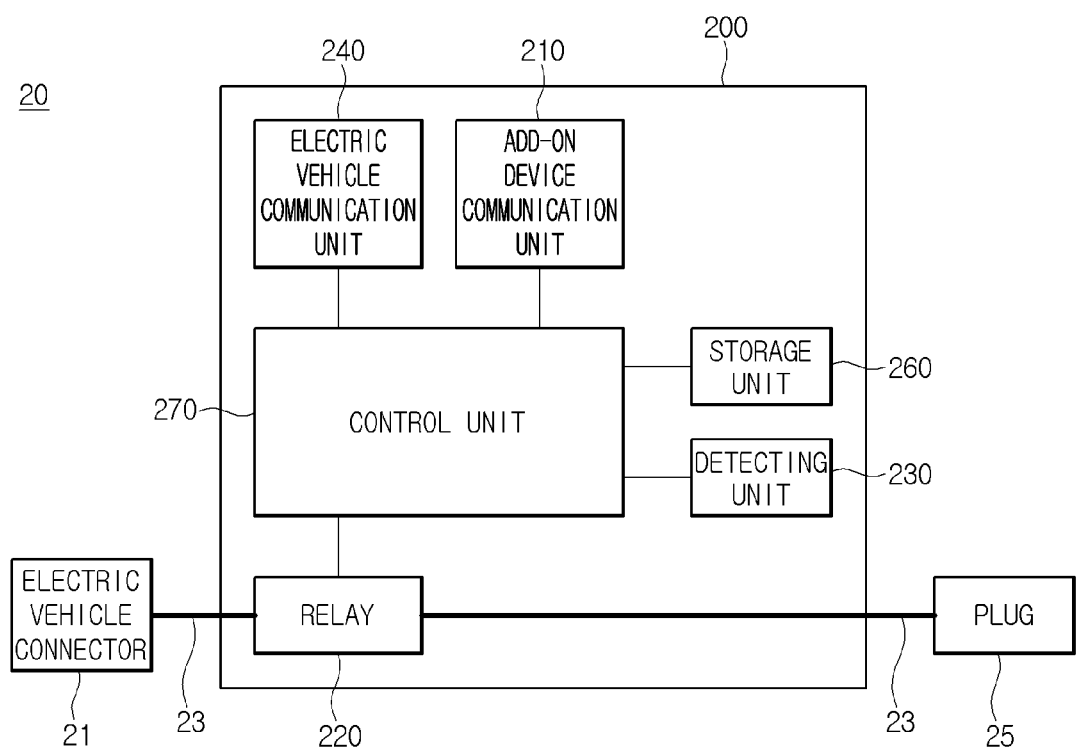
FIG. 7 is a block diagram of an electrical vehicle charging cable assembly according to another embodiment.

FIG. 7 is a block diagram of an electric vehicle charging cable assembly according to another embodiment.

As described above, the electric vehicle charging cable assembly 20 includes the cable installment type charging control device 200, the electric vehicle connector 21, the power cable 23, and the plug 25.

At this point, the cable installment type charging control device 200 includes an add-on device communication unit 210, a relay 220, a detecting unit 230, an electric vehicle communication unit 240, a storage unit 260, and a control unit 270. When comparing with the embodiment of FIG. 3, the cable installment type charging control device 200 shown in FIG. 7 further includes the add-on device communication unit 210. In addition, although the cable installment type charging control device 200 shown in FIG. 7 may not include the terminal device communication unit 250 in order to reduce the price and the repair cost, the cable installment type charging control device 200 may include the terminal device communication unit 250 according to various applications.

Since the relay 220, the detecting unit 230, the electric vehicle communication unit 240, the storage unit 260, and the control unit 270 according to the embodiment are the same as or similar to those of the embodiment of FIG. 3, or may be described later.

The add-on device communication unit 210 performs communication with the add-on communication device 400. The add-on device communication unit 210 and the add-on communication device 400 may perform communication with each other through an IrDA scheme, a radio frequency communication scheme, a Bluetooth scheme, a UWB scheme, a ZigBee scheme, and a DLNA scheme.

In particular, in order to reduce the price of the electric vehicle charging cable assembly 20 and the add-on communication device 400, the add-on device communication unit 210 may adopt the IrDA scheme. At this point, the add-on device communication unit 210 may include an infrared light emitting diode and an infrared light receiving diode.

Figure 8:
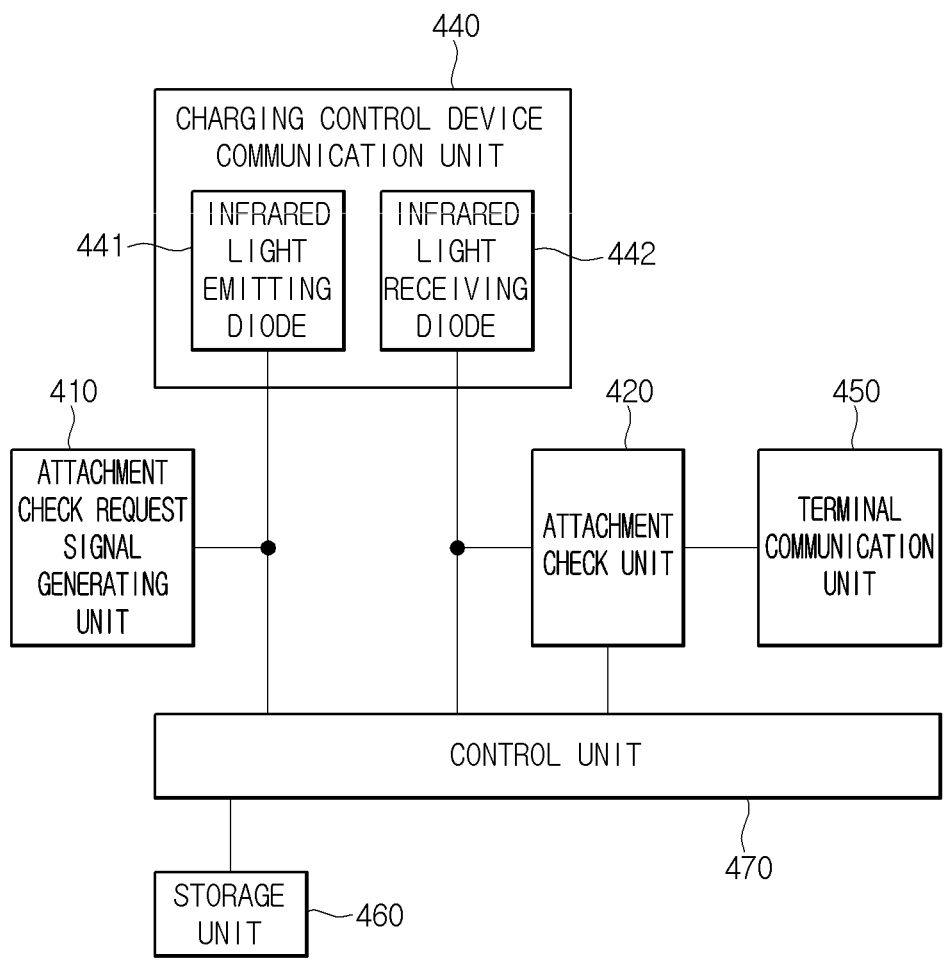
FIG. 8 is a block diagram of an add-on communication apparatus according to an embodiment.

FIG. 8 is a block diagram of an add-on communication device according to an embodiment.

The add-on communication device 400 includes an attachment check request signal generating unit 410, an attachment check unit 420, a charging control device communication unit 440, a terminal communication unit 450, a storage unit 460, and a control unit 470.

The charging control device communication unit 440 performs communication with the cable installment type charging control device 200. In detail, the charging control device communication unit 440 performs communication with the add-on device communication unit 210 of the cable installment type charging control device 200. The charging control device communication unit 440 and the add-on device communication unit 210 may perform communication with each other through an IrDA scheme, a radio frequency communication scheme, a Bluetooth scheme, a UWB scheme, a ZigBee scheme, and a DLNA scheme.

In order to reduce the price of the electric vehicle charging cable assembly 20 and the add-on communication device 400, the charging control device communication unit 440 may employ the IrDA scheme. At this point, the charging control device communication unit 440 may include an infrared light emitting diode 441 and an infrared light receiving diode 442.

When the add-on communication device 400 is normally attached to the cable installment type charging control device 200, positions of the infrared light emitting diode 441 and the infrared light receiving diode 442 of the charging control device communication unit 440 are matched with the infrared light receiving diode and the infrared light emitting diode of the add-on device communication unit 210 of the cable installment type charging control device 200, respectively.

The terminal communication unit 450 performs communication with the terminal device 300. In detail, the terminal communication unit 450 performs communication with the communication unit 310 of the terminal device 300. In detail, the terminal communication unit 450 and the communication unit 310 may perform communication with each other through an IrDA scheme, a radio frequency communication scheme, a Bluetooth scheme, a UWB scheme, a ZigBee scheme, and a DLNA scheme. In particular, the terminal communication unit 450 may perform communication with the terminal device 300 by using at least one of a wireless local area network (WLAN) such as Wi-Fi specified in IEEE 802.11 and wireless wide area network (WWAN) specified in IEEE 802.16 or long term evolution (LTE) specification.

The storage unit 460 stores following information. In detail, the storage unit 460 may store the charging related information on the electric vehicle 100. The storage unit 460 may store information on the use history of the cable installment type charging control device 200. For example, the storage unit 460 may store information on a final use time point, use time, and accumulated use time of the cable installment type charging control device 200.

The control unit 470 controls an overall operation of the add-on communication device 400 together with the following operation.

Since the add-on communication device 400 is not directly and electrically connected to the cable installment type charging control device 200, the add-on communication device 400 is necessary to additionally receive power. However, when a user does not use the add-on communication device 400, the user may not cut off the power supplied to the add-on communication device 400. Accordingly, since the unnecessary power consumption is increased, a scheme of minimizing power consumption is required when the add-on communication device 400 is not used.

FIG. 9 shows a ladder diagram of an operation method of the electric vehicle charging system 10 according to another embodiment.

The control unit 330 of the terminal device 300 obtains a user input for setting the add-on communication device 400 (operation S301). The user input for setting the add-on communication device 400 may include at least of an allowable charge amount and a charging mode. The allowable charge amount may include at least one of an allowable charge amount in a public area and an allowable charge amount in a home area. The charging mode may include at least one of a charging mode in a public area and in a home area. The allowable charge amount may be represented as an absolute value represented as a unit such as Wh or a relative value represented as a unit such as %. A set of values that the charging mode may represent may include a high speed charging mode and a low speed charging mode.

The control unit 330 of the terminal device 300 transmits setting information corresponding to the obtained user input to the add-on communication device 400 through the communication unit 310 (operation S303). At this point, the setting information may include at least one of setting information on the allowable charge amount and setting information on the charging mode. The setting information on the allowable charge amount may include at least one of setting information on allowable charge amount in the public area and setting information on allowable charge amount in the home area. The setting information on the charging mode may include at least one of setting information on charging mode in the public area and setting information on charging mode in the home area. Through this, the control unit 407 of the add-on communication device 400 receives the setting information from the terminal device 300 through the terminal communication unit 450.

The add-on communication device 400 stores the received setting information in the storage area 460 and sets the add-on communication device 400 based on the received setting information (operation S305).

Furthermore, the control unit 330 of the terminal device 300 obtains a user input for commanding the electric vehicle charging cable assembly 20 through the input device 320 (operation S315). At this point, the user input for controlling the electric vehicle charging cable assembly 20 may include one or more of an input to start charging of the electric vehicle 100, an input to stop the charging of the electric vehicle 100, and an input to request the charging related information on the electric vehicle 100. The user input may include at least one of high speed charging start and low speed charging start.

The control unit 330 of the terminal device 300 transmits a command corresponding to the obtained user input to the add-on communication device 400 through the communication unit 310 (operation S317). The control unit 470 of the add-on communication device 400 may receive a command from the terminal device 300 through the terminal communication unit 450. At this point, a set of values that the command may represent may include charging start of the electric vehicle 100, charging stop of the electric vehicle 100, a request for charging related information on the electric vehicle 100. A set of values that the charging start of the electric vehicle 100 may represent may include the high speed charging start and low speed charging start of the electric vehicle 100.

The control unit 470 of the add-on communication device 400 creates a control command for controlling the cable installment type charging control device 200 (operation S318). The control unit 470 of the add-on communication device 400 may create the control command on the basis of at least one of a command received from the terminal device 300, a current position, and setting information and a charging state of the electric vehicle 100 which is a monitoring result to be described later. At this point, a set of values that the control command may represent may include charging start, charging stop, or a request for charging related information on the electric vehicle. A set of values that the charging start may represent may include the high speed charging start and low speed charging start.

In an embodiment, when the command received from the terminal device 300 is the charging start, the control unit 470 of the add-on communication device 400 may create a control command representing the charging start.

In an embodiment, when the command received from the terminal device 300 is the high speed charging start, the control unit 470 of the add-on communication device 400 may create a control command representing the high speed charging start.

In an embodiment, when the command received from the terminal device 300 is the low speed charging start, the control unit 470 of the add-on communication device 400 may create a control command representing the low speed charging start.

In an embodiment, when the command received from the terminal device 300 is the charging start and the set charging mode is the high speed charging mode, the control unit 470 of the add-on communication device 400 may create a control command representing the high speed charging start.

In an embodiment, when the command received from the terminal device 300 is the charging start and the set charging mode is the low speed charging mode, the control unit 470 of the add-on communication device 400 may create a control command representing the low speed charging start.

In an embodiment, when the command received from the terminal device 300 is the charging stop, the control unit 470 of the add-on communication device 400 may create a control command representing the charging stop.

In an embodiment, when the command received from the terminal device 300 is the request for charging related information on the electric vehicle, the control unit 470 of the add-on communication device 400 may create a control command representing the request for charging related information on the electric vehicle.

In an embodiment, when the command received from the terminal device 300 is the charging start and the current position is in the home area, the control unit 470 of the add-on communication device 400 may create a control command representing the charging start according to the charging mode set in the home area. In detail, when the set charging mode in the home area is the high speed charging mode, the control unit 470 of the add-on communication device 400 may create a control command representing the high speed charging start. When the set charging mode in the home area is the low speed charging mode, the control unit 470 of the add-on communication device 400 may create a control command representing the low speed charging start.

In an embodiment, when the command received from the terminal device 300 is the charging start and the current position is in the public area, the control unit 470 of the add-on communication device 400 may create a control command representing the charging start according to the set charging mode in the public area. In detail, when the set charging mode in the public area is the high speed charging mode, the control unit 470 of the add-on communication device 400 may create a control command representing the high speed charging start. When the set charging mode in the public area is the low speed charging mode, the control unit 470 of the add-on communication device 400 may create a control command representing the low speed charging start.

In an embodiment, when the command received from the terminal device is the charging start and the current position is in the home area, the control unit 470 of the add-on communication device 400 may create a control command representing the low speed charging start.

In an embodiment, when the command received from the terminal device is the charging start and the current position is in the public area, the control unit 470 of the add-on communication device 400 may create a control command representing the high speed charging start.

In an embodiment, when the command received from the terminal device is the charging start and a power quantity supplied to the electric vehicle 100 reaches the set allowable charge amount according to the monitoring result, the control unit 470 of the add-on communication unit 400 may create a control command representing the charging stop.

In an embodiment, when the command received from the terminal device is the charging start, the current position is in the home area, and a power quantity supplied to the electric vehicle 100 reaches the set allowable charge amount in the home area according to the monitoring result, the control unit 470 of the add-on communication unit 400 may create a control command representing the charging stop.

In an embodiment, when the command received from the terminal device is the charging start, the current position is the public area, and a power quantity supplied to the electric vehicle 100 reaches the set allowable charge amount in the public area according to a monitoring result, the control unit 470 of the add-on communication unit 400 may create a control command representing the charging stop.

To this end, the control unit 470 of the add-on communication device 400 may obtain a current position of the electric vehicle 100. The control unit 470 of the add-on communication device 400 may obtain the current position of the electric vehicle 100 by using one or more of information on a global positioning system (GPS), information on a base station of a wireless short range network, and information on a base station in a wireless long range network.

A set of values that the current position may represent may be the home area and the public area.

The control unit 470 of the add-on communication device 400 transmits the created control command to the cable installment type charging control device 200 through the charging control device communication unit 440 (operation S319). The infrared light emitting diode 441 of the charging control device communication device 440 may emit an infrared light having a digital pattern corresponding to the created control command.

The control unit 270 of the cable installment type charging control device 200 executes the received control command (operation S321).

In detail, when the command corresponding to the user input is the charging start of the electric vehicle 100, the control unit 270 of the cable installment type charging control device 200 may turn on the relay 220 which is turned off and allows the electric vehicle charging cable assembly 20 to provide AC power from the socket 30 to the electric vehicle 100.

When the a command corresponding to the user input is the high speed charging start of the electric vehicle 100, the control unit 270 of the cable installment type charging control device 200 may turn on the relay 220 which is turned off and allows the electric vehicle charging cable assembly 20 to provide AC power from the socket 30 to the electric vehicle 100 in a high speed.

When the a command corresponding to the user input is the low speed charging start of the electric vehicle 100, the control unit 270 of the cable installment type charging control device 200 may turn on the relay 220 which is turned off and allows the electric vehicle charging cable assembly 20 to provide AC power from the socket 30 to the electric vehicle 100 in a low speed.

When the command corresponding to the user input is the charging stop of the electric vehicle 100, the control unit 270 of the cable installment type charging control device 200 may turn off the relay 220 which is turned on and prevents the electric vehicle charging cable assembly 20 from charging the electric vehicle 100 any longer.

When the command corresponding to the user input is the request for charging related information on the electric vehicle, the control unit 270 of the cable installment type charging control device 200 may collect the charging related information on the electric vehicle.

The control unit 270 of the cable installment type charging control device 200 transmits a response corresponding to the received command to the add-on communication device 400 through the add-on device communication unit 210 (operation S323). The infrared light emitting diode of the add-on device communication unit 210 of the cable installment type charging control device 200 may emit an infrared light having a digital pattern corresponding to a response to the receive command. The control unit 470 of the add-on communication device 400 may receive a response from the cable installment type charging control device 200 through the charging control device communication unit 440.

When the command corresponding to the user input is the charging start of the electric vehicle 100, the response may include information notifying that the relay 220 is in a turned on state.

When the command corresponding to the user input is the high speed charging start of the electric vehicle 100, the response may include information notifying that the relay 220 is in a turned on state for high speed charging.

When the command corresponding to the user input is the low speed charging start of the electric vehicle 100, the response may include information notifying that the relay 220 is in a turned on state for low speed charging.

When the command corresponding to the user input is the charging stop of the electric vehicle 100, the response may include information notifying that the relay 220 is in a turned off state.

When the command corresponding to the user input is the request for charging related information on the electric vehicle 100, the response may include collected charging related information on the electric vehicle 100. As describe above, the charging relation information on the electric vehicle 100 may include at least one of information on the electric vehicle 100 and information on the electric vehicle charging cable assembly 20.

The control unit 470 of the add-on communication device 400 transmits the received response to the terminal device 300 through the terminal communication unit 450 (operation S325).

The control unit 330 of the terminal device 300 displays the received response on the display unit 340 (operation S327). Since the operation described in operation S109 may be applied to the operation described in the operation S327, detailed description about the operation S327 is omitted.

On the other hand, the control unit 470 of the add-on communication device 400 checks whether the created control command is completed (operation S331).

When the created control command is the charging start, the allowable charge amount is set, and the charging is not completed, the control unit 470 of the add-on communication device 400 may determine that the created control command is not completed.

When the created control command is the charging stop, the request for charging related information on the electric vehicle, or the charging start in a state where the allowable charge amount is not set, the control unit 470 of the add-on communication device 400 may determine that the created control command is completed.

When the received control command is completed, the control unit 470 of the add-on communication device 400 may wait for receiving new setting information or a new command.

When the received control command is not completed, the control unit 470 of the add-on communication device 400 monitors a charging state of the electric vehicle 100 (operation S333). In particular, the control unit 470 of the add-on communication device 400 may monitor a power quantity supplied to the electric vehicle 100.

The control unit 470 of the add-on communication device 400 checks whether an additional control command is necessary for the cable installment type charging control device 200 on the basis of at least one of the charging state of the electric vehicle 100 and the setting information (operation S335). In detail, the control unit 470 of the add-on communication device 400 may compare the power quantity supplied to the electric vehicle 100 and the set allowable charge amount and check whether the additional control command is necessary for the cable installment type charging control device 200. When the power quantity supplied to the electric vehicle 100 reaches the set allowable charge amount, the control unit 470 of the add-on communication device 400 may determine that the additional control command is necessary for the cable installment type charging control device 200. When the power quantity supplied to the electric vehicle 100 does not reach the set allowable charge amount, the control unit 470 of the add-on communication device 400 may not determine that the additional control command is necessary for the cable installment type charging control device 200.

When the additional control command is not necessary, the control unit 470 of the add-on communication device 400 may continuously monitor the charging state of the electric vehicle 100.

When the additional control command is necessary, the control unit 470 of the add-on communication device 400 creates the additional control command (operation S318). The creation of the control command in this case is as described above, the description about that is omitted here.

According to an embodiment, the above-described method can be embodied as processor readable codes on a program recorded medium. Examples of the processor readable recording medium include read-only memory (ROM), random-access memory (RAM), CD-ROMs, magnetic tapes, floppy disks, and optical data storage devices, and carrier waves (such as data transmission through the Internet).

Not only the configurations and methods of the embodiments are limitedly applied to the above-described mobile terminal, but also the whole embodiments or parts of the embodiments can be selectively combined and configured to allow various modifications to be conducted.

The embodiment is to maintain the characteristics of the cable installment type charging control device manufactured to have the characteristics robust to an external temperature, external humidity, vibration, and impact, to facilitate the repair for the cable installment type charging control device, and to conveniently provide the charging-related information on the electric vehicle to a user without increasing the cost when the cable installment type charging control device is replaced with new one.

The embodiment is to minimize power consumption when power supplied to the unused add-on communication apparatus is not cut off.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An operation method of an add-on communication device attached to a cable installment type charging control device attached to a cable assembly for charging an electric vehicle, the method comprising:
   receiving a command from a terminal device;
   creating a first control command on the basis on the command; and
   transmitting the first control command to the cable installment type charging control device,
   wherein a set of values representable by the command comprises at least one of charging start of the electric vehicle, charging stop of the electric vehicle, or a request for charging related information on the electric vehicle,
   receiving setting information from the terminal device;
   creating a second control command corresponding to an additional control command of the first control command on the basis of the setting information; and
   transmitting the second control command to the cable installment type charging control device,
   wherein the creating of the second control command comprises:
   checking the first control command is completed;
   when the first control command is not completed, monitoring a charging state of the electric vehicle;
   checking whether the addition control command is necessary for the cable installment type charging control device on the basis of at least one of the charging state of the electric vehicle or the setting information; and
   creating the second control command corresponding to the additional control command on the basis of the setting information and the charging state of the electric vehicle.

2. The method according to claim 1, wherein the charging state of the electric vehicle comprises a power quantity supplied to the electric vehicle,
   the setting information comprises information on an allowable charge amount, and
   the checking of whether the additional control command is necessary comprises comparing the power quantity supplied to the electric vehicle and the allowable charge amount and checking whether the additional control command is necessary.

3. The method according to claim 2, wherein the comparing of the power quantity supplied to the electric vehicle and the allowable charge amount comprises:
   when the power quantity supplied to the electric vehicle reaches the allowable charge amount, determining that the additional control command is necessary; and
   when the power quantity supplied to the electric vehicle does not reach the allowable charge amount, determining that the additional control command is not necessary.

* * * * *